Oct. 10, 1967     L. W. REYNOLDS     3,345,989
IMPLANTABLE POWER SOURCE EMPLOYING A BODY
FLUID AS AN ELECTROLYTE
Filed Nov. 5, 1963

INVENTOR.
LUTHER W. REYNOLDS
BY R H Quist
ATTORNEY

United States Patent Office 3,345,989
Patented Oct. 10, 1967

3,345,989
IMPLANTABLE POWER SOURCE EMPLOYING A BODY FLUID AS AN ELECTROLYTE
Luther W. Reynolds, Philadelphia, Pa., assignor to General Electric Company, a corporation of New York
Filed Nov. 5, 1963, Ser. No. 321,643
2 Claims. (Cl. 128—419)

ABSTRACT OF THE DISCLOSURE

A metal electrode is surgically implanted in body tissue. A second electrode, preferably made of platinum black sandwiched between platinum screens, is implanted in another site such as the abdomen. The body fluids serve as an electrolyte for establishing a conductive path for electrons emitted by the first electrode, thus creating a primary electric power source. An implanted electronic device may close the circuit and be supplied by way of insulated leads running from each electrode to the device.

This invention relates generally to a source of electrical energy and more particularly to apparatus for deriving usable electrical energy from an animal.

Advances in science and medicine have made possible the implantation of various devices in the bodies of animals, including man. For example, a cardiac timer known as an artificial electronic stimulator can be implanted near the heart and used to provide stimulating impulses to the heart to maintain its beat at a desired rate. In addition, it has been found desirable to attach to animals apparatus which will receive transmitted electromagnetic signals and stimulate the animal by suitably implanted electrodes. See, for example, United States patent application Ser. No. 191,791, filed May 2, 1962, now Patent Number 3,179,890, dated Apr. 20, 1965, and assigned to assignee of the present invention, entitled, Remotely Controlled Stimulator. It may also be desirable to attach to an animal a transmitter which will permit locating the animal by means of a radio direction finder.

Where devices such as these have been implanted, it has been necessary to implant a source of electrical energy for their operation. The source presently used is a battery, which must be replaced periodically. Replacement of the battery requires reopening the portion of the body in which the device is implanted, a process which has many obvious disadvantages. In addition, a battery is both bulky and heavy, causing discomfort to the bearer.

It is, therefore, an object of this invention to provide a source of electrical energy which may be implanted in the body of an animal, such as man, and which will not require replacement during the life of the device which it is intended to power.

In carrying out the invention, one electrode is implanted subcutaneously, for example, in the chest, and a second electrode is implanted within the abdominal cavity of the animal. The leads from the two electrodes which are also implanted are then connected to the electrical device.

Figure 1:
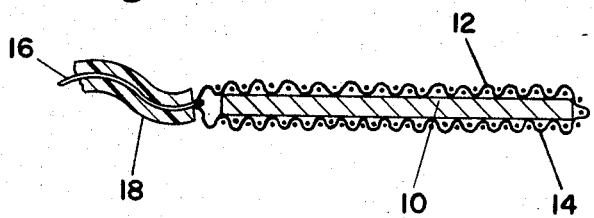
Figure 2:
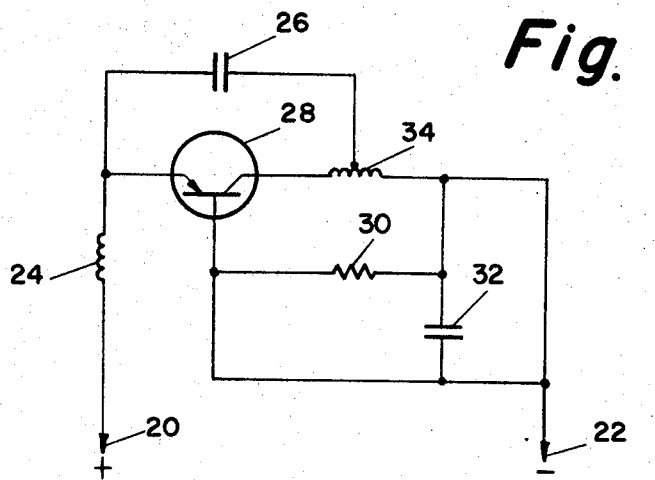

The invention will be better understood from the following description taken in connection with the accompanying drawing, in which:

FIGURE 1 is a schematic cross-section of one type of electrode which may be used in practicing this invention; and FIGURE 2 is a schematic circuit diagram of an oscillator which has been powered by the implanted electrodes of this invention.

Referring to FIGURE 1, an electrode is shown constructed with a thin film of platinum black 10 sandwiched between upper and lower screens of platinum, 12 and 14 respectively. In this construction, platinum black 10 is the electrode with screens 12 and 14 acting as the collector of electrons. Platinum black is particularly recommended as an electrode since it will not be eroded by body fluids. Just as important is what might be called the biological inertness of platinum black; that is, it does not cause any adverse biological reactions when implanted in a body.

Connected to screens 12 and 14 is lead 16. Lead 16 is preferably helically coiled or braided to permit its elongation and contraction in conformance with body movements. Stainless steel or platinum are suitable materials for lead 16. Lead 16 is enclosed in a sheath of Teflon or polyethylene 18 to insulate it from the body. The material used for sheath 18 should also be biologically inert.

Electrodes of the design shown in FIGURE 1, approximately 2 centimeters square, have been implanted in a rat. It is possible that a larger electrode would be used in a human subject or a larger animal. In experimenting with rats, various locations for implantation of the two electrodes required were tried. The best results, from the standpoint of power output, have been achieved with one electrode placed subcutaneously. The particular location of this electrode does not appear to affect the power output, thereby permitting it to be selected considering other facts, such as providing a short lead length.

The second electrode has been placed in such sites as the intestine, rectum and the abdominal cavity. The latter location appears to yield the best results.

In some cases it has been found that good results are obtained when instead of the electrode shown in FIGURE 1, an electrode without the platinum black film 10, but otherwise the same, is used in the subcutaneous site.

It should be recognized that in implanting an electrode for a long period, it should not be placed where the flesh will tend to move over the electrode because of muscle activity. In such a location it may be expected that the body will build a protective calcium shell about the electrode because of the mechanical irritation. On the other hand, if the electrode is implanted in a location where this relative movement does not occur, no such protective covering should develop.

Experiments have been conducted to determine the best electrode material and the best location for the particular material.

Chart I discloses how the electrical characteristics obtained will vary when different electrode materials are used in the same locations. In this series of experiments with rats, one electrode was implanted subcutaneously (S.Q.) and one in the abdominal region (Abd.). It should be noted that a variation occurred even when a platinum black electrode was constructed from a film obtained from different locations.

CHART I.—ELECTRICAL VALUES OBTAINED WITH Pt METALS

| Electrode Material | | Open Circuit, volts | Power, μw. | Current, μa. | Resistance, ohms×10⁻³ | Voltage, mv. |
|---|---|---|---|---|---|---|
| S.Q. | Abd. | | | | | |
| Pt-Rh* | Pt-Blk [1] | .30 | 6.0 | 50 | 2.4 | 120 |
| Pt** | Pt-Blk [1] | .12 | .2 | 20 | .5 | 10 |
| Pt-Rh* | Pt-Blk [2] | .25 | 2.4 | 11 | 20 | 220 |
| Pt** | Pt-Blk [2] | .06 | .02 | 1 | 20 | 20 |
| Pt** | Pt-Rh* | .10 | .025 | 2.5 | 4 | 10 |
| Pt-Rh* | Pt-Blk [1] | .22 | 0.8 | 5 | 32 | 160 |

[1] Platinum Black from Missile and Space Division, GE.
[2] Platinum Black from Direct Energy Conversion Operation, GE.
*10% Rhodium.
**100% Platinum.

In Chart II are displayed the results of experiments conducted on rats in which one electrode was platinum black and the other electrode varied in material. All of these materials are supposedly biologically inert with the possible exception of nickel, and all may have some utility in carrying out this invention.

CHART II.—ELECTRICAL VALUES OBTAINED WITH DIFFERENT TYPES OF METAL

| Electrode Material | | Open Circuit, volts | Power, Max. μw. | Current, μa. | Resistance, ohms×10⁻³ | Voltage, mv. |
|---|---|---|---|---|---|---|
| S.Q. | Abd. | | | | | |
| Pt-Blk([1]) | Ta | .44 | 1.7 | 13 | 10 | 130 |
| Ta | Pt-Blk [1] | .42 | 11.6 | 34 | 10 | 340 |
| Stainless 310 | Pt-Blk [1] | .26 | 4.2 | 65 | 1 | 65 |
| Hastaloy | Pt-Blk [1] | .39 | 10 | 100 | 1 | 100 |
| Stainless* | Pt-Blk [2] | .68 | 115 | 480 | .5 | 240 |
| Stainless | Pt-Blk [1] | .63 | 78 | 280 | 1 | 280 |
| Stainless | Pt-Blk [2] | .74 | 48 | 220 | 1 | 220 |
| Nickel Alloy** | Pt-Blk [2] | .46 | 51 | 170 | 1.75 | 300 |
| Stainless | Pt-Blk [1] | .29 | 4 | 6 | 10 | 60 |
| Ni-foam | Pt-Blk [1] | .58 | 24 | 155 | 1 | 155 |
| Ni-plate | Pt-Blk [1] | .46 | 20 | 155 | 1 | 155 |
| Pt-Blk([1]) | Ni-plate | .24 | 12 | 110 | 1 | 110 |
| C | Pt-Blk [1] | .28 | 5 | 23 | 10 | 230 |

[1] Platinum Black from Missile and Space Division, GE.
[2] Platinum Black from Direct Energy Conversion Operation, GE.
*Artery clamp.
**Five-cent piece.

In order that the power available from even such a small animal as a rat be demonstrated, the oscillator shown in FIGURE 2 was constructed. In accordance with this invention, the oscillator was powered by a rat anesthetized with Nembutal. For a period of eight hours, a stable signal was generated. This signal was received by a radio receiver in the laboratory. No drop in signal strength was observed during the test period. The rat was killed at the end of the eight hour test.

A basic oscillator circuit designed to work on low voltages (0.4 to 0.15 volt at 50 or less microamperes) is utilized. Positive and negative electrodes 20 and 22, respectively, are connected to the rat in the manner previously described. Electrode 20 is connected to a radio frequency choke coil 24. A first capacitor 26 is connected across the emitter and collector of PNP transistor (2N2362) 28. Resistor 30 and capacitor 32 are connected as shown. An antenna was not required in this circuit since coil 34 was wound on a ferrite core. A 500 kilocycle output was transmitted by this circuit powered only by the rat.

While particular embodiments of a source of electrical energy have been shown and described, it will be obvious that changes and modifications can be made without departing from the spirit of the invention and the scope of the appended claims.

What is claimed as new and desired to be secured by Letters Patent of the United States is:

1. A source of electrical energy for an electrically powered device adapted to be implanted within the body of an animal comprising:
   a first electrode adapted to be implanted subcutaneously in said body,
   said first electrode being a platinum screen,
   a second electrode adapted to be implanted within the abdominal cavity of said body,
   said second electrode comprising a film of platinum black enclosed by a platinum screen,
   said first electrode being characterized by it yielding electrons to the second electrode through the fluid of the body, and
   leads adapted to be implanted in the body for connecting said first and second electrodes to said electrically powered device.

2. A source of electrical energy for an electrically powered device implanted within the body of an animal comprising:
   a first electrode of bare metal adapted to be implanted subcutaneously in said body,
   a second electrode adapted to be implanted within the abdominal cavity of said body,
   said second electrode having a film of platinum black enclosed by a platinum screen,
   said first electrode being characterized by it yielding electrons to the second electrode through the fluid of the body, and
   insulated leads adapted to be implanted in the body for connecting said first and second electrodes to said electrically powered device.

References Cited

UNITED STATES PATENTS

| 1,427,171 | 8/1922 | Smith | 204—292 X |
| 2,895,479 | 7/1959 | Lloyd | 128—417 |
| 3,035,583 | 5/1962 | Hirsh et al. | 128—418 X |
| 3,087,486 | 4/1963 | Kilpatrick | 128—418 X |
| 3,133,537 | 5/1964 | Muth | 128—2 |

RICHARD A. GAUDET, *Primary Examiner.*
W. E. KAMM, *Assistant Examiner.*